United States Patent [19]
Hong

[11] Patent Number: 5,493,338
[45] Date of Patent: Feb. 20, 1996

[54] SCAN CONVERTER OF TELEVISION RECEIVER AND SCAN CONVERTING METHOD THEREOF

[75] Inventor: Sung H. Hong, Seoul, Rep. of Korea

[73] Assignee: Goldstar Co., Ltd., Seoul, Rep. of Korea

[21] Appl. No.: 302,486

[22] Filed: Sep. 12, 1994

Related U.S. Application Data

[63] Continuation of Ser. No. 998,071, Dec. 28, 1992.

[30] Foreign Application Priority Data

Dec. 28, 1991 [KR] Rep. of Korea .................. 1991-24934

[51] Int. Cl.$^6$ ............................. H04N 7/01; H04N 5/21; H04N 5/14
[52] U.S. Cl. ........................... 348/441; 348/450; 348/458
[58] Field of Search ..................................... 348/450, 458, 348/441; H04N 7/01, 5/21, 5/14, 11/00

[56] References Cited

U.S. PATENT DOCUMENTS 5,070,394 12/1991 Kobayuashi ............................... 358/11
5,168,358 12/1992 Ishizu et al. ............................... 358/11

FOREIGN PATENT DOCUMENTS

391094 10/1990 European Pat. Off. ......... H04N 7/01
17028 10/1992 WIPO .............................. H04N 7/01

Primary Examiner—James J. Groody
Assistant Examiner—Glenton B. Burgess
Attorney, Agent, or Firm—Spencer, Frank & Schneider

[57] ABSTRACT

A method and apparatus is provided for increasing scanning line numbers for TV video signal utilizing a three dimensional medial filter. The method and apparatus inhibit the picture quality from being deteriorated due to a vertical resolution decreasing, shimmering and step edge phenomenon and the like occurring at the intra-field interpolation system, inter-field interpolation system and motion adaptive interpolation system which are conventional scanning line number increasing systems that increase TV scanning line number. The method and apparatus includes a three dimensional median filter which applies a weighing factor to pixel components of horizontal, vertical and diagonal directions of pixel component's periphery to be interpolated by the horizontal, vertical and time axis judging signals, and which can be applied for increasing the scanning line numbers of the luminance signal or the chrominance signal in an improved definition television IDTV receiver or an extended definition television EDTV receiver.

19 Claims, 8 Drawing Sheets

FIG. 7B  Field (t1)

| X1 | X2 | X3 |

FIG. 7C  Field (t2)

| X4 | X5 | X6 |
|    | Xi |    |
| X7 | X8 | X9 |

FIG. 7D  Field (t3)

Line n−1, Line n, Line n+1

| X10 | X11 | X12 |

FIG. 9

SCAN CONVERTER OF TELEVISION RECEIVER AND SCAN CONVERTING METHOD THEREOF

This is a continuation of co-pending application Ser. No. 07/998,071, filed on Dec. 28, 1992.

FIELD OF THE INVENTION

The present invention relates to a method and apparatus for doubling the scanning lines of television signal of an interlaced scan system, and more particularly to a scan converter of television receiver and scan converting method thereof which is made to double the scanning lines by changing a weight in accordance with the horizontal, vertical and time detail judging or determining signals.

BACKGROUND OF THE INVENTION

A television picture is a one dimensional time series signal made into a two dimensional picture by scanning, and which becomes to be seen as a timely and spatially continued picture by a time and space integral effect of eyesight. Accordingly, when every second's picture numbers is little, the time integral effect is not sufficient whereby plane flicker is occurred, and when the scanning line numbers is little, the spatial integral effect is not sufficient whereby it becomes a rough picture so that scanning lines are seen by eyes. The interlaced scanning system such as NTSC system is directed to reduce a plane flicker by making every second's picture numbers to be many, but relative to the picture of non-interlaced scanning system of 525 scanning lines which is doubled the scan, the spatial integral effect is decreased, and the picture becomes rough whereby it becomes seen to eyes.

Thus, as a scanning line numbers doubling method for solving the problems such as line structure and vertical resolution deficiencies occurred due to lack of scanning line numbers, an intra-field interpolation system for interpolating by averaging upper and lower scanning lines of scanning line to be interpolated, and an inter-field interpolation system for interpolating by a scanning line of previous field of the scanning line to be interpolated, are offered. And, recently a motion adaptive interpolation system is offered which executes the interpolation by using the intra-field interpolation system in an image region having a motion by discriminating a degree of motion within the image and executes the interpolation by using the inter-field interpolation system in the image region having no motion.

Figure 1A:
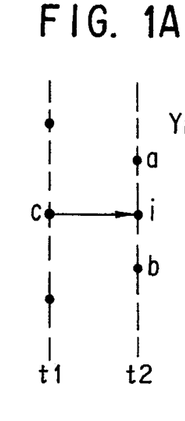
Figure 1B:
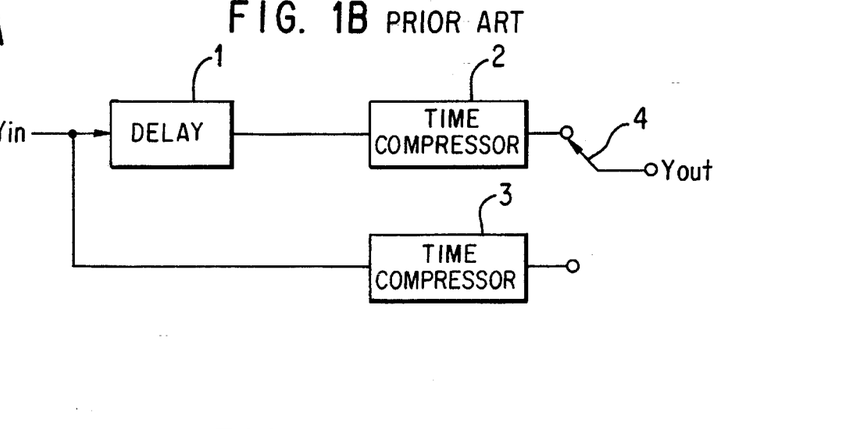
Figure 2A:
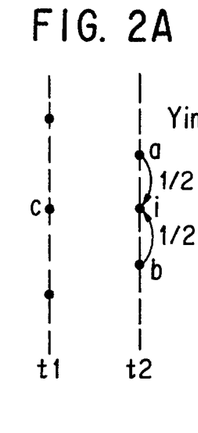
Figure 2B:
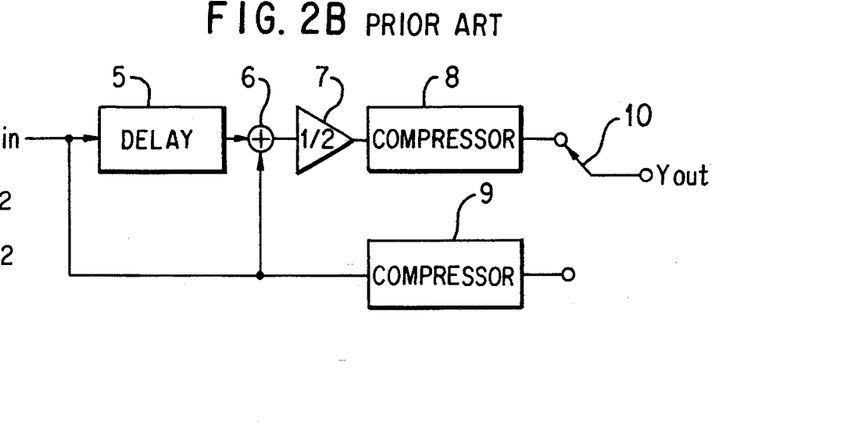
Figure 3A:
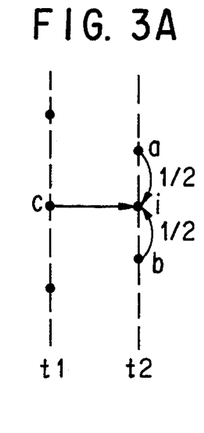

FIG. 1(A),(B) to FIG. 3(A),(B) are diagrams for respectively illustrating the aforementioned inter-field interpolation system, intra-field interpolation system and motion adaptive interpolation system.

FIG. 1(A),(B) are respectively a conceptive diagram and circuit diagram for illustrating the inter-field interpolation system. A scanning line(i) within a field(t2) to be interpolated is made by substituting a scanning line(c) within a previous field(t1). An inputted luminance signal Yin is made to a signal which is compressed to ⅔ time by a time compressor 3 and to a signal which is compressed to ⅔ time after delaying one field by a time compressor 2 and thereafter respective output clock signal is selected by switching a switch 4. A clock signal of the time compressor 2 is selected for the scanning line(i) to be interpolated while a clock signal of the time compressor 3 is selected for original scanning lines(a and b).

FIG. 2(A),(B) are respectively a conceptive diagram and circuit diagram for illustrating the intra-field interpolation system. A scanning line(i) within a field(t2) to be interpolated is made by averaging upper and lower scanning lines(a,b) within the same field(t2). A signal in which the inputted luminance signal Yin is averaged with a signal delayed it by one line by a delay element 5, summer 6, divider 7 and time compressor 8 and then compressed to ⅔ time, and a signal in which the inputted luminance signal Yin is compressed to ⅔ time by a time compressor 9, are made, and thereafter respective output clock signal is selected by switching a switch 10. The clock signal of the time compressor 8 is selected for the scanning line(i) to be interpolated while the clock signal of the time compressor 9 is selected for original scanning lines(a and b).

However, there has been a problem that in the inter-field interpolation system, in case of image having a motion, a shimmering phenomenon and step edge phenomenon are occurred whereby a picture quality reduced, while in the intra-field interpolation system, a signal to be used for the interpolation is made by an average of two scanning lines whereby a vertical resolution is decreased.

Figure 3B:
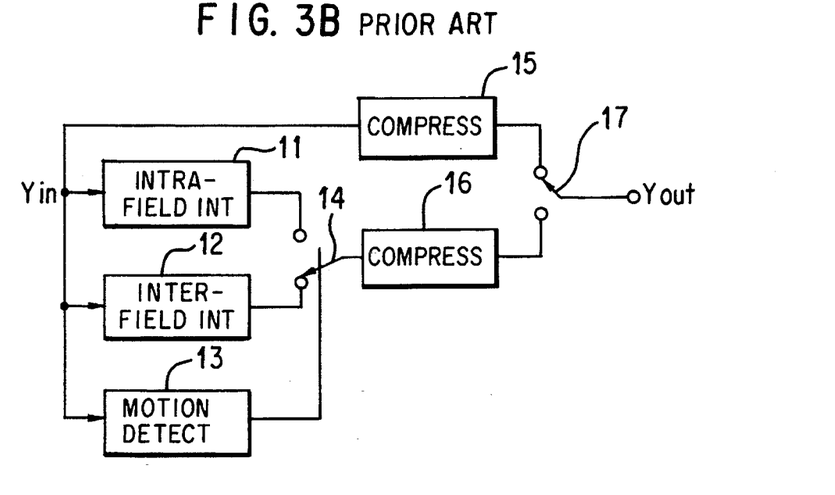

That of recently offered in order to solve the problems occurred in the aforementioned systems is a motion adaptive interpolation system shown in FIG. 3(A),(B). An inputted luminance signal Yin is made to a signal to be used for an interpolation of a scanning line(i) within a field(t2) to be interpolated by an intra-field interpolator 11 and an inter-field interpolator 12 and thereafter a motion detecting section 13 judges a motion within the inputted image and then a pixel to be interpolated within a region corresponding to the motion region is interpolated by using an image signal made by the intra-field interpolation system. A pixel to be interpolated within a region having no motion is interpolated by using an image signal made by the inter-field interpolation system. The output signals of the interpolators 11 and 12 in accordance with the switching state of a switch 14 is used for a scanning line(i) to be interpolated by being compressed to ⅔ time by a time compressor 16. On the other hand, a signal in which the inputted luminance signal Yin is compressed to ⅔ time by a time compressor 15 is used for original scanning lines(a and b).

The motion adaptive interpolation system operating as this principle exerts a relatively better performance in case of judging well the motion of the inputted signal, but an exactness of the motion judgement is lowered for a complex video signal mixed with the luminance signal and chrominance signal. Accordingly, in case when if judging with respect to the inputted signal having a motion as a region having no motion, an error would be occurred in the interpolation whereby a remarkable picture quality deterioration phenomenon such as a shimmering, step edge or motion blur would be occurred, while in case when if judging with respect to a region having no motion as a region having a motion, a problem such as a vertical resolution decrease is occurred.

And, in the interpolation system also, since only pixels of upper and lower of the pixel same vertical position to be interpolated or pixels of horizontal positions of previous and later field are used, aforementioned conventional interpolation systems are difficult to do an exact scanning line interpolation in case when a video signal of image region having a motion has a detail of vertical direction or diagonal direction. Moreover, there has been a disadvantage that a confrontation is in lack for the region having a successive motion.

SUMMARY OF THE INVENTION

Therefore, it is an object of the present invention to provide a scan converting method of television receiver utilizing a weight which is made to judge a vertical detail, horizontal detail, and time direction detail, and to change a weighting factor to a vertical, horizontal, and time axis directions whereby obtain video signal of scanning lines to be interpolated.

Another object of the present invention is to provide a scan converter of television receiver utilizing a weight which is made to judge a vertical detail, horizontal detail, and time direction detail and to change a weighting factor to a vertical, horizontal, and time axis directions whereby obtain video signal of scanning lines to be interpolated.

A feature of the present invention for attaining these objects resides in a scan converting method of television receiver comprising: a step for logically operating by combining each detail judgement signal so as to generate a control signal in accordance with the degree of vertical, horizontal, and time axis details of video signal; a step for storing video signals delayed by one field; and a step for executing a median operation as below by putting a weight in accordance with the above-described control signal to substantial pixel samples residing in a field including a pixel component to be executed by an interpolation and in its previous and later fields.

$$X(m, n, t2) = \text{MED} [ A * X(m-1, n-1, t2), A * X(m-1, n+1, t2), A * X(m+1, n-1, t2), A * X(m+1, n+1, t2), B * X(m, n-1, t2), B * X(m, n+1, t2), C * X(m-1, n, t1), C * X(m+1, n, t1), C * X(m-1, n, t3), C * X(m+1, n t3) D * X(m, n, t1), D * X(m, n, t3), E * \underline{X}(m, n, t2), F * \underline{X}(m, n, t2),]$$

(wherein, X represents a pixel sample, n is a horizontal scanning line within a field, m is a vertical scanning line within a field, t is a field, and , represents a weighting operator, MED is a median operator, and A represents a weight for diagonal component, B is a weight for vertical component, C is a weight for horizontal component, D is a weight for a time axis component, E is a weight for an average of vertical components when a motion is present, and F represents a weight for a time axis component when a motion is not present.)

Still other object of the present invention is to provide a scan converter of television receiver comprising: a means for receiving a video signal of interlaced scanning system whereby judging degrees of horizontal, vertical and time axis details; memories for field delaying said video signal; and a means for executing an interpolation by putting a weight in accordance with said control signal to a substantial pixel samples residing in a field contained with a pixel component to be interpolated by an interpolation and in its previous and later fields.

BRIEF DESCRIPTION OF THE DRAWINGS

FIG. 1s is are diagrams for illustrating a conventional inter-field interpolation system, in which FIG. 1(A) is a conceptive diagram and FIG. 1(B) is a circuit diagram, FIG. 2s are diagrams for illustrating a conventional intra-field interpolation system, in which FIG. 2(A) is a conceptive diagram and FIG. 2(B) is a circuit diagram, FIG. 3s are diagrams for illustrating a conventional motion adaptive interpolation system, in which FIG. 3(A) is a conceptive diagram and FIG. 3(B) is a circuit diagram, FIG. 4s are diagrams for illustrating a scanning line number increasing system of TV video signal in accordance with the present invention, in which

DETAILED DESCRIPTION OF THE INVENTION

Hereinafter, the present invention will be described in more detail with reference to the accompanying drawings.

Figure 4A:
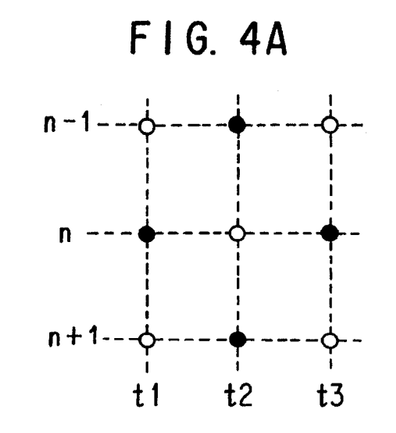
FIG. 4(A) is a conceptive diagram and FIGS. 4(B)–4(D) are field state diagrams.
Figure 4B:
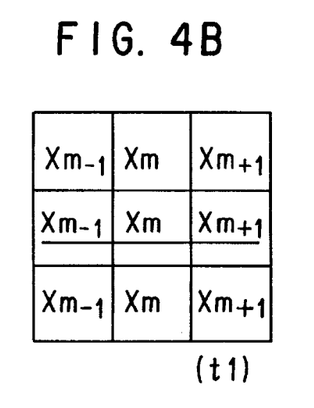
Figure 4C:
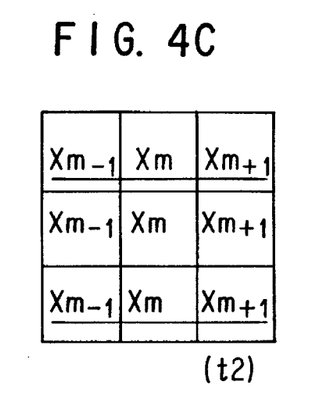
Figure 4D:
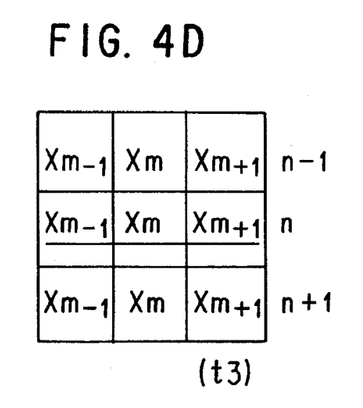

FIG. 4s are a diagrams for illustrating a scanning line number increasing system of TV video signal in accordance with the present invention, in which FIG. 4(A) is a conceptive diagram, and FIG. 4(B) is a field state diagram showing each field as a pixel component. In the present invention, a scanning line n of the field t2 to be interpolated is interpolated by utilizing each scanning line n of the fields t1 and t3 and the scanning lines n−1 and n+1 components of the field t2 as shown in FIG. 4(A). That which has described the fields as t1 to t3 in here is for expressing that there was a lapse of time among each fields. In FIG. 4(B), the interpolation is executed after a weight is given to these practical pixel components in accordance with the degrees of each horizontal, vertical and time axis details by using practically existing pixel components (underlined portion in FIG. 4(B)) in order to make pixel sample of scanning line n residing in the field t2.

Figure 5:
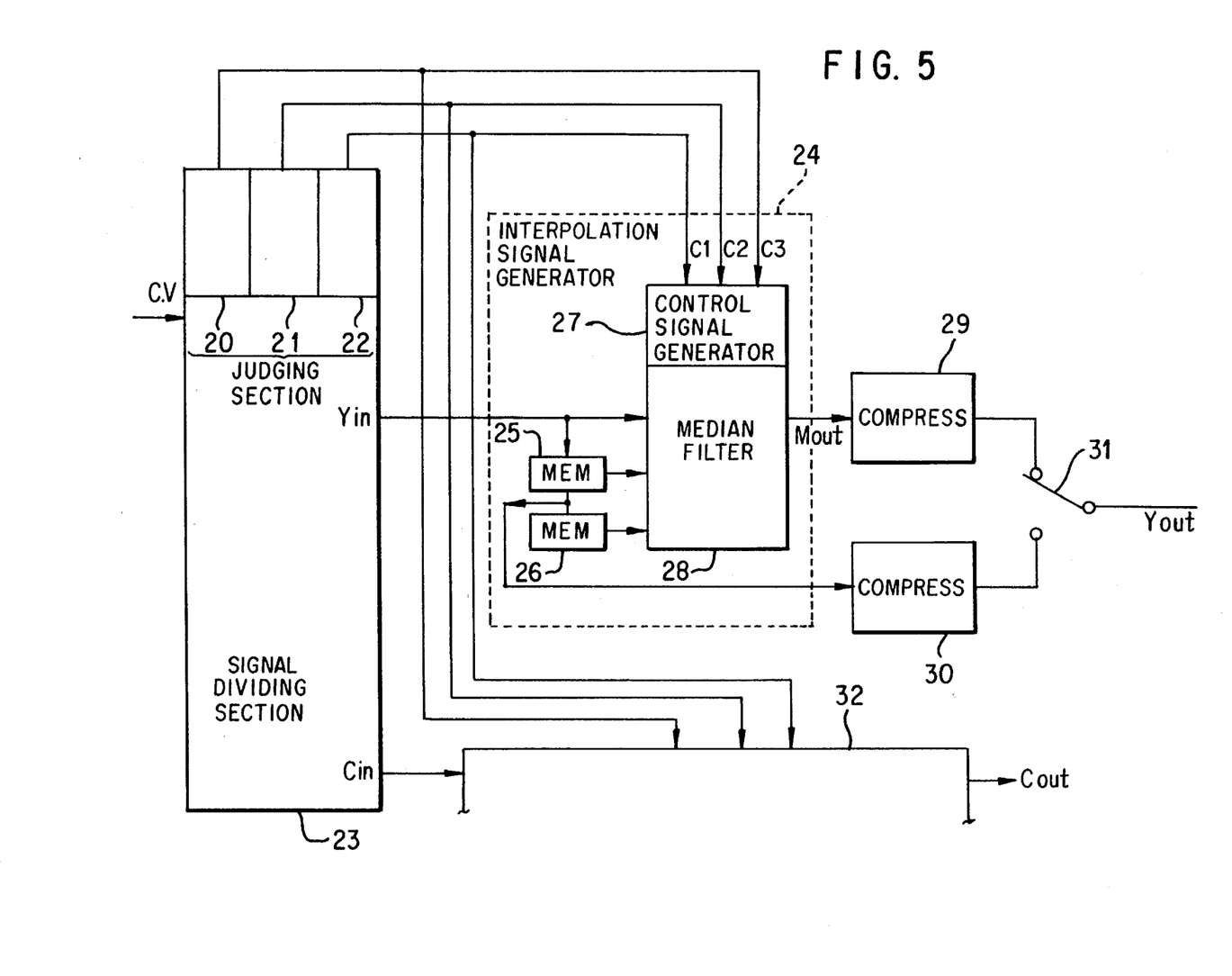
FIG. 5 is a block diagram of scan converter of television receiver in accordance with a first embodiment of the present invention.

FIG. 5 is a block diagram of the scan converter in accordance with the first embodiment of the present invention, and which comprises: a judging section 20 to 22 for judging a degree of horizontal, vertical and time axis details of an inputted complex video signal CV; an interpolating section 24 consisting of a luminance/chrominance signal dividing section 23 for dividing a luminance signal Yin and a chrominance signal Cin from the complex video signal CV in accordance with the judgement signals C1 to C3 judged at the judging sections 20 to 22, two field memories 25 and 26, a control signal generating section 27 and a median filter section 28, and for executing a predetermined interpolation by putting a weight to a pixel sample actually existing in a field to be executed by the interpolation; time compressors 29,30 for ⅔ time compressing the signal executed by a predetermined interpolation at the interpolation section 24 and the luminance signal Yin divided at the luminance/chrominance signal dividing section 23; and a switch 31 for switching each output of the time compressor 29,30 whereby obtaining a signal having scanning lines increased in double.

In a scan converter of the present invention configured as these, the luminance/chrominance signal dividing section 23 divides or separates the received complex video signal CV as shown in FIG. 5 into the luminance signal Yin and the chrominance signal Cin in accordance with the judgement signal of horizontal, vertical and time axis detail judging section 20 to 22 and then inputs to a median filter section 28 within the interpolation signal generating section 24. The memories 25 and 26 receives the luminance signal Yin Explaining a method for obtaining the pixel sample used for the interpolation, it will be as follows.

Following expressions exhibit a method for adding a weight to the pixel samples actually existing around periphery within the field t2 and the previous and later fields t1 and t3 of the field t2 to be interpolated with X(m, n, t2) being a pixel sample to be interpolated shown in FIG. 4(B) in accordance with the horizontal, vertical and time axis detail degrees and thereafter for obtaining by the median filtering.

$$X(m, n, t2) = \text{MED} [ A * X(m-1, n-1, t2), A * X(m-1, n+1, t2), A * X(m+1, n-1, t2), A * X(m+1, n+1, t2), B * X(m, n-1, t2), B * X(m, n+1, t2), C * X(m-1, n, t1), C * X(m+1, n, t1), C * X(m-1, n, t3), C * X(m+1, n, t3), D * X(m, n, t1), D * X(m, n, t3), E * \overline{X}(m, n, t2), F * \underline{X}(m, n, t2), ]$$
--------------------Expression (1)

$$\overline{X}(m, n, t2) = 1/2 [ X(m, n, t2) + X(m, n+1, t2) ]$$
--------------------Expression (2)

$$\underline{X}(m, n, t2) = 1/2 [ X(m, n, t1) + X(m, n, t3) ]$$
--------------------Expression (3)

divided by the luminance/chrominance signal dividing section 23 and stores two field signals among three inputted field signals of the median filter section 28 to be used for the interpolation, and then outputs them. The control signal generating section 27 combines the judgement signals C1 to C3 of the judging section 20 to 22 and generates a control signal for putting a weight to the pixel sample.

According to this, a predetermined interpolation is executed at the interpolating section 24 and thereafter 2/1 time compressed at the time compressing section 29, while the original luminance signal Yin or chrominance signal Cin is immediately 2/1 time compressed at the time compressing section 30. Thereafter, a signal having scanning lines increased in double is finally outputted by a switching operation of the switch 31. A detailed constitution of the interpolating section for the chrominance signal is not shown in this embodiment, but the interpolation in accordance with the present invention can of course be applied to the chrominance signal as well.

Figure 6:
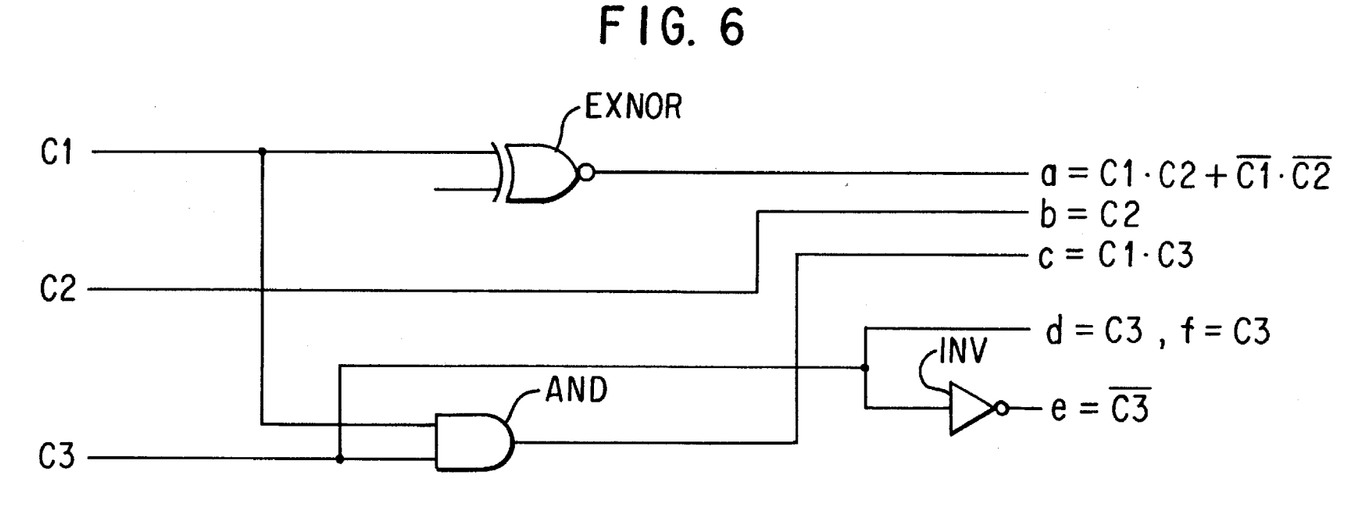
FIG. 6 is a detailed circuit diagram of a control signal generating section of FIG. 5.

FIG. 6 is a detailed circuit diagram of the control signal generating section 27 of FIG. 5, and which includes an exclusive NOR gate EXNOR, AND gate AND and an inverter INV. This combines the horizontal, vertical and time axis detail judging signals C1 to C3 whereby outputs a signal for controlling the median filter section 28.

The control signal(a) for converting the weight for the diagonal component is obtained through the exclusive nor gate EXNOR which inputs a horizontal detail judgement signal C1 and a vertical detail judgement signal C2, and the control signal (b) for converting the weight for the vertical component is obtained by outputting the vertical detail judgement signal C2 as it is. And, the control signal(c) for converting the weight for the horizontal component can be obtained through the AND gate AND which inputs the horizontal detail judgement signal C1 and the time axis detail judgement signal C3. The control signal(d) for converting the weight for the time axis component is obtained by outputting the time axis detail judgement signal C3 as it is. The control signal(e) for converting the weight for an average of the horizontal component in case where a motion is present by judging a motion degree is obtained through the inverter INV which inputs the time axis detail judgement signal C3, and the control signal(f) for converting the weight for an average of the time axis component in case where a motion is not present by judging the motion degree is obtained by outputting the time axis detail judgement signal C3 as it is, similarly as the time of obtaining the control signal(d).

In the expression (1), a symbol * represents a weighting operator, and a symbol MED represents a median operator. And, a coefficient A is a weight for the diagonal component, and when the control signal(a=C1.C2+ C1.C2) is "high" state(a case that horizontal and vertical details are either simultaneously occurred or simultaneously not occurred), 1 is taken, and when it is "low" state, 0 is taken. A symbol B is a weight for the vertical component, and when the control signal(b=C2) of the control signal generating section 27 is "high" state(a case that the vertical detail component is not present), 2 is taken, and when it is "low" state, 1 is taken. A symbol C is a weight for the horizontal component, and when the control signal(c=C1.C3) in FIG. 6 is "high" state(a case that the horizontal and time axis detail are not present), 1 is taken, and when it is "low" state, 0 is taken. A symbol D is a weight for the time axis component, and when the control signal(d=C3) in FIG. 6 is "high" state(a case that the time axis detail is not present), 2 is taken, and when it is "low" state, 1 is taken. A symbol E is a weight for an average of the horizontal component when a motion is present and a symbol F is a weight for an average of the time axis component when a motion is not present, and 3 or 0 is taken in accordance with the control signals(e=C3, f=C3) in FIG. 6.

Following table 1 shows a relation between the aforementioned weights and each detail component.

TABLE 1

| C1 | C2 | C3 | A | B | C | D | E | F |
|---|---|---|---|---|---|---|---|---|
| 0 | 0 | 0 | 1 | 1 | 0 | 1 | 3 | 0 |
| 0 | 0 | 1 | 1 | 1 | 0 | 2 | 0 | 3 |
| 0 | 1 | 0 | 0 | 2 | 0 | 1 | 3 | 0 |
| 0 | 1 | 1 | 0 | 2 | 0 | 2 | 0 | 3 |
| 1 | 0 | 0 | 0 | 1 | 0 | 1 | 3 | 0 |
| 1 | 0 | 1 | 0 | 1 | 1 | 2 | 0 | 3 |
| 1 | 1 | 0 | 1 | 2 | 0 | 1 | 3 | 0 |
| 1 | 1 | 1 | 1 | 2 | 1 | 2 | 0 | 3 |

In above table 1, each weight can be pertinently changed in accordance with the requirement, but a value of E+F should be an odd number. For instance, as shown in table 1, it is possible to set as E=3, F=0 or E=0, F=3, and also to E=2, F=1 or E=1, F=2 and so on.

Figure 7A:
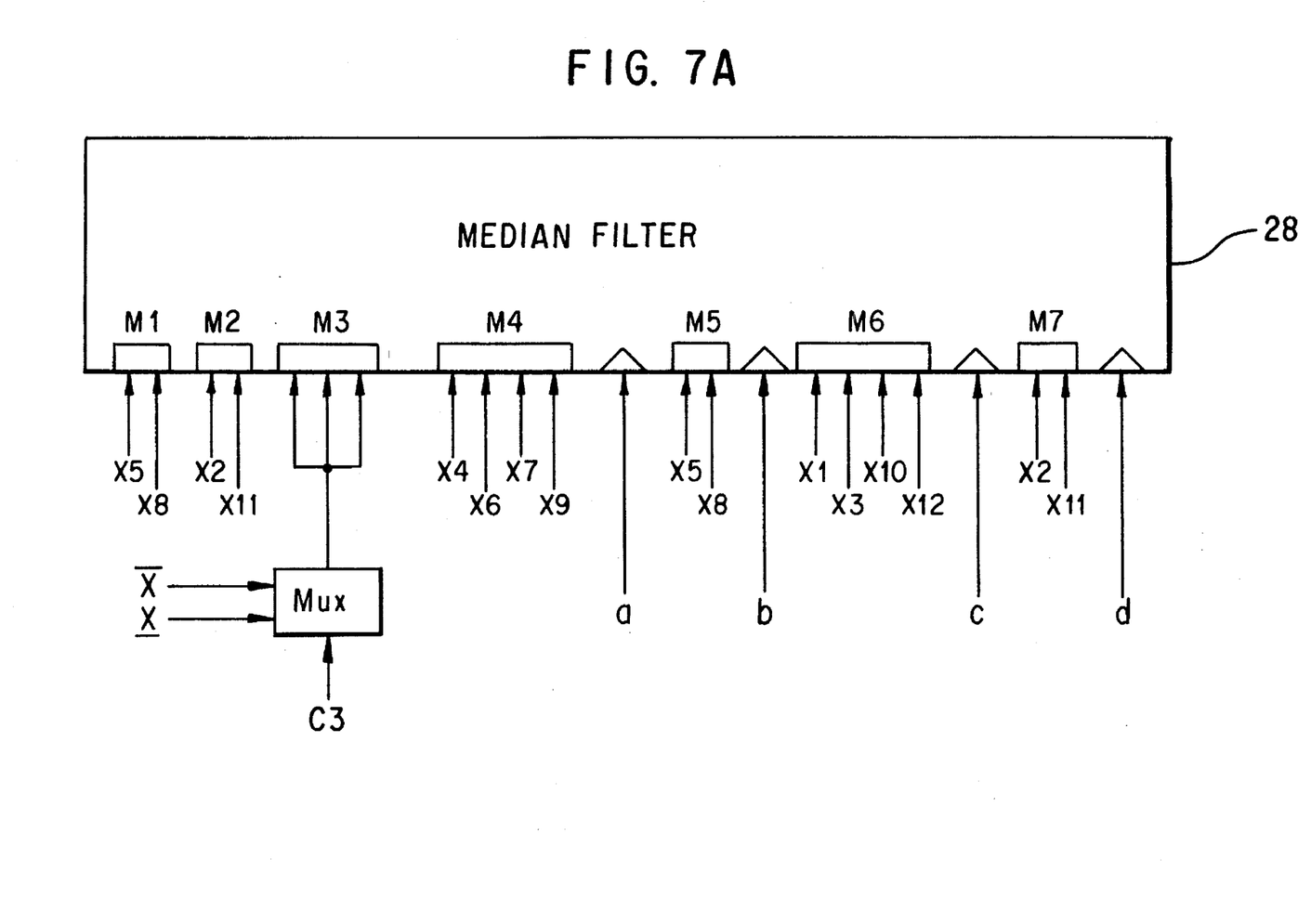
FIG. 7(A) is a diagram showing an example of a median filter section of FIG. 5, and FIG. 7(B)–7(D) are field state diagrams showing positions of pixels.
Figure 7B:
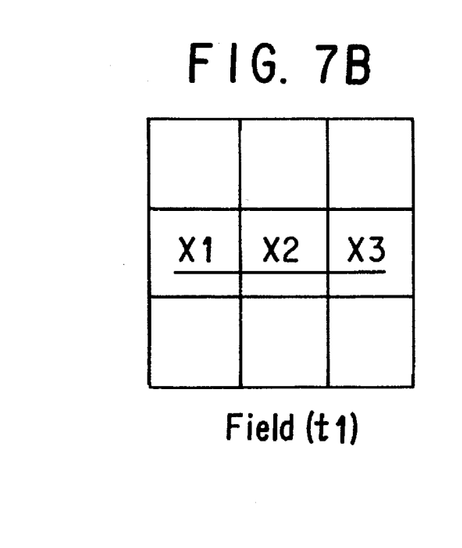
Figure 7C:
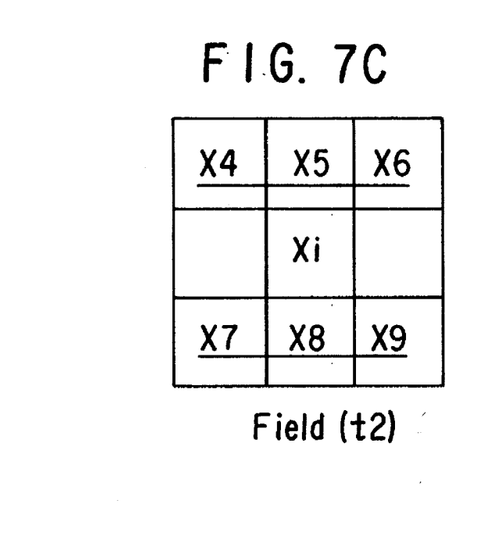
Figure 7D:
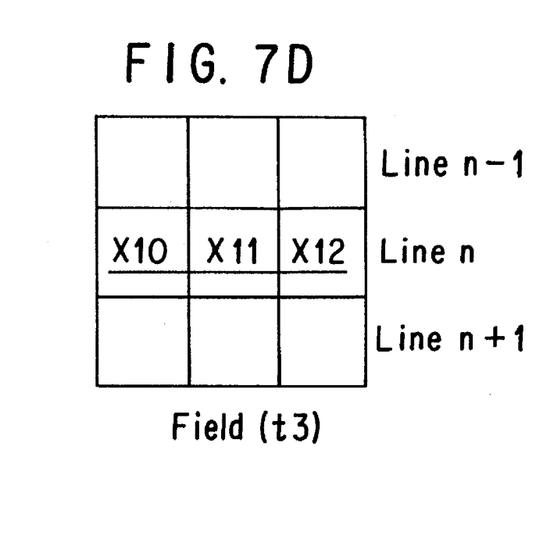

FIG. 7(A) is a diagram showing an example of the median filter section of FIG. 5, and FIG. 7(B) is field state diagrams showing the position of the pixel. In the drawings, Xi is a pixel to be interpolated. Since the vertical component and the time axis component are important components to be used for the interpolation, they are made to be inputted as they were to the median filter section 28 by putting the M1 component(X5,X8) and M2 component(X2,X11).

In the control signal generating section 27, when the control signal (a) for changing the weight for the diagonal component is "high" state, the M4 component(X4,X6,X7, X9) is utilized to the median operation, and when it is "low" state, it is not utilized. And, the control signal(b) for changing the weight for the horizontal component is "high" state, the M5 component(X5,X8) is utilized to the median operation, and when it is "low" state, it is not utilized. Similarly, for the control signal(c) for changing the weight for the horizontal component and the control signal(d) for changing the weight for the time axis component also, the M6 component (X1,X3,X10,X12) and M7 component(X2,X11) are utilized or for the median operation in accordance with the "high" state of control signals (c) and (d) respectively and are not utilized in accordance with the "low" state of control signals(c) and (d). On the other hand, the control signal(e) for changing the weight for the average of the vertical component in case where a motion is present by judging the motion degree and the control signal(f) for changing the weight for the average of the time axis component in case where a motion is not present are applied to a multiplexer 34. According to this, when the control signal(e) is "high" state(at this time, the control signal (f) becomes "low" state), 3 is taken as a weight $\bar{X}$ to the M3 component and 0 is taken as $\underline{X}$ to the M3 component. On the contrary, when the control signal (f) is "high" state(at this time, the control signal(e) becomes "low" state), 3 is taken as a weight $\bar{X}$ to the M3 component and 0 is taken as $\underline{X}$ to the M3 component. FIG. 7 shows a state that $\bar{X}$ the M3 component and $\underline{X}$ of the M3 component take 3 or 0, but as already described before, 2 or 1 can of course be taken.

Accordingly, entire median operation is carried out with components from minimum 7(in case where a, b, c, d are all "low" states) to maximum 19(in case where a, b, c, d are all "high" states).

Figure 8:
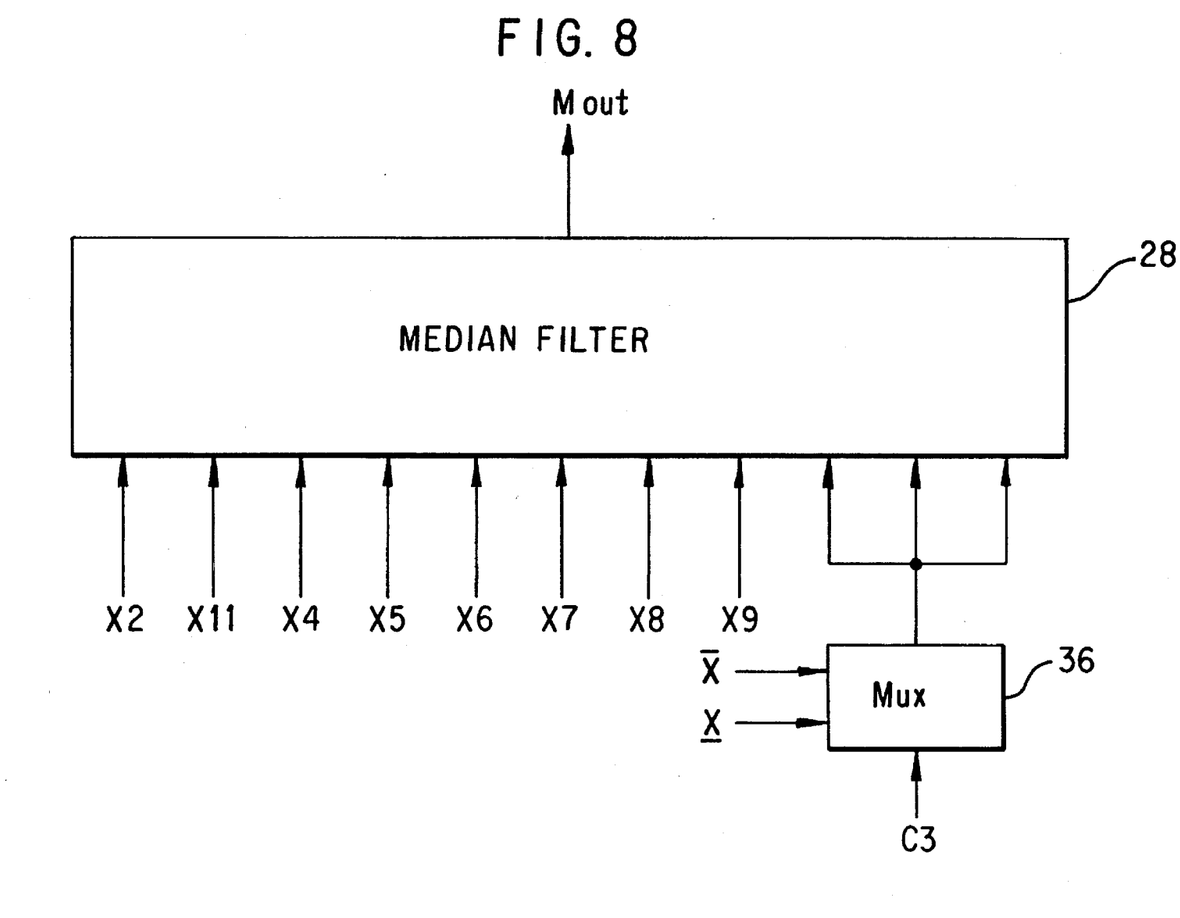
FIG. 8 is a diagram showing another example of the median filter section of FIG. 5.

FIG. 8 is a diagram showing another example of the median filter section of FIG. 5, and the pixel sample X(i) to be interpolated is obtained by a simplified median operational expression by following expression (4).

$$X(i)=MED [X4,X5,X6,X7,X8,X9,X2,X,11, \alpha^* \bar{X}, \beta^* \underline{X}]$$

Expression (4)

As can be understood by above expression (4), the weights of $\bar{X}\{=\frac{1}{2}( X5+X8)\}$ and $\underline{X}$ $(=\frac{1}{2}(X2+X11))$ are changed only by the time axis detail judging signal C3, and which puts the vertical, time axis and diagonal pixel components {the pixels X5,X8,X2,X11,X4, X6, X7,X9 of FIG. 7(B)} as a basic input. That is, when the time axis detail judging signal C3 is "low" state(a case where the detail is present in the time axis), the weighting factors α=3(or 2) β=0(or 1) are taken, and when the time axis detail judging signal C3 is "high" state(a case where the detail is not present in the time axis), the weighting factors α=0(or 1), β=3(or 2) are taken. In here also, the value of the weighting factor should be an odd number. In FIG. 8, the operation of a multiplexer 36 is same as the case of aforementioned FIG. 7.

When doing like this, the basic input component of the median filter is reduced from 19 to 11 and thereby the control signal generating section 27 becomes unnecessary whereby the circuit becomes greatly simplified.

Figure 9:
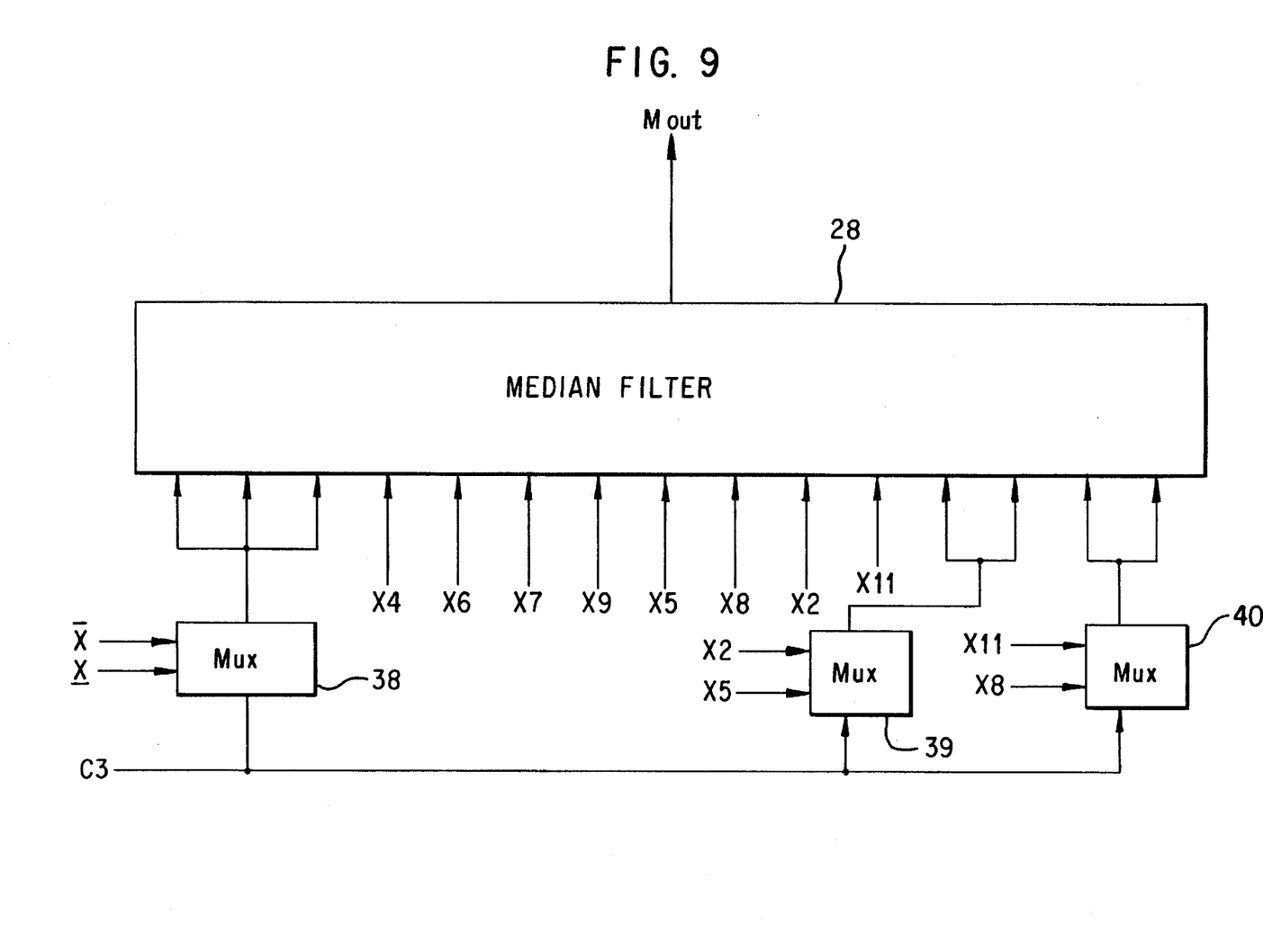
FIG. 9 is a diagram showing still other example of the median filter section of FIG. 5.

FIG. 9 is a diagram showing a still other example of the median filter section of FIG. 5, and the pixel sample X(i) to be used for the interpolation is obtained by a simplified median operational expression by following expression (5).

$$X(i)=MED[\alpha'^*\bar{X}, \beta'^*\underline{X}, \gamma^*X8, \theta^* X11,X4,X6,X7,X9]$$

Expression (5)

As can be understood from above expression (5), only the diagonal component( the pixels(X4,X6,X7,X9) of FIG. 7(B)} is put as a basic input being regardless of the control signal, and the weights of the time axis component and vertical axis component are changed by the time axis detail judging signal C3.

Following table 2 shows relations of these time axis judging signal and the weighting factors α', β', γ, and θ.

TABLE 2

| C3 | α | β | γ | θ |
|---|---|---|---|---|
| 0 | 3(2) | 0(1) | 2 | 1 |
| 1 | 0(1) | 3(2) | 1 | 2 |

In FIG. 9, the multiplexers 38 to 40 output $\bar{X}$, X2, and X11 when the time axis detail judging signal C3 is "high" state, and output $\underline{X}$, X5, and X8 when the signal C3 is "low" state. Accordingly, entire input component of the median filter 28 becomes 15, therefore it is possible to know that its configuration became simple relative to the circuit of FIG. 7.

And, although the interpolating method in accordance with the present invention is applicable to increase the scanning line numbers of the chrominance signal as described before, only for the chrominance signal, it does not matter also to use a method for repeatedly scanning the previous scanning line as well as a conventional intra-field interpolation system. Moreover, the interpolation system in accordance with the present invention can be utilized also to the increase of the field rate, and other control signal can also be used in place of the horizontal, vertical and time axis detail judging signals being used as a control signal in this method.

As described above, in accordance with the method and apparatus for increasing the scanning line numbers of television receiver utilizing a three dimensional weight median filter of the present invention, a remarkable picture quality deterioration such as a vertical resolution decrease, shimmering and step edge occurring from the intra-field interpolation system or the inter-field interpolation system which are the scanning line increasing system used for TV can be improved by changing the weight in accordance with the horizontal, vertical and time axis detail judging signal. And, in case of the motion adaptive interpolation system, with regard to the remarkable picture quality deterioration occurring due to difficulty to find out an exact motion from the complex video signal mixed with the chrominance signal and the luminance signal, in accordance with the method and apparatus of the present invention, since the weight is changed by the control signal applied to the complex video signal, an effect that a remarkable picture quality deterioration is not occurred even if in case where the control signal is mistaken. Further, a confrontation even for the change of diagonal direction and horizontal direction is possible by considering even for the diagonal direction and horizontal direction components which does not consider in the conventional interpolation system, and the interpolation can be effectively executed even in the video region that a motion is very slow.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. Scan converting method for a television receiver comprising steps for:

judging a horizontal, vertical, and time axis detail degrees from a composite video signal;

separating a luminance signal and chrominance signal from composite video signal in accordance with each said judged detail degree;

detecting a first field to be interpolated, a second field which is a previous field of said first field and a third field which is a later field of said first field, from said luminance signal;

logically combining each said judged detail degree so as to generate control signals;

executing median operation by putting weights to substantial pixel samples existing in said first, second, and third fields in accordance with said control signals;

2/1 time compressing said median operated signal and a presently applied field; and increasing the scanning lines in double by selectively switching said 2/1 time compressed signals.

2. Scan converting method for a television receiver as defined in claim 1, wherein said median operation is executed as follows:

$$x(m, n, t2) = MED(A * X(m-1, n-1, t2), A * X(m-1, n+1, t2), A * X(m+1, n-1, t2), A * X(m+1, n+1, t2), B * X(m, n-1, t2), B * X(m, n+1, t2), C * X(m-1, n, t1), C * X(m+1, n, t1), C * X(m-1, n, t3), C * X(m+1, n, t3), D * X(m, n, t1), D * X(m, n, t3), E * \overline{X}(m, n, t2), F * \underline{X}(m, n, t2),),$$

wherein, X represents a pixel sample, n is horizontal scanning lines within a field, m is vertical scanning lines within a field, * is a weighting operator, MED is a median operator, and A represents a weight for a diagonal component, B is a weight for a vertical component, D is a weight for a time axis component, E is a weight for an average of vertical component when a motion is present, and F represents a weight for a time axis component when a motion is not present.

3. Scan converting method for a television receiver as defined in claim 1, wherein said median operation is executed as follows:

$$X(m, n, t2) = MED(X(m-1, n-1, t2), X(m-1, n+1, t2), X(m+1, n-1, t2), X(m+1, n+1, t2), X(m, n-1, t2), X(m, n+1, t2), X(m, n, t1), X(m, n, t3), \alpha * \overline{X}(m, n, t2), \beta * \underline{X}(m, n, t2),),$$

wherein, $\alpha$ represents a weight for an average of the vertical component when a motion is present, and $\beta$ represents a weight for an average of the time axis component when a motion is not present.

4. Scan converting method of television receiver as defined in claim 1, wherein said median operation is executed as follows:

$$X(m, n, t2) = MED(\alpha' * \overline{X}(m, n, t2), \beta' * \underline{X}(m, n, t2), \gamma * X(m, n-1, t2), \gamma * X(m, n+1, t2), \theta * X(m, n, t1), \theta * X(m, n, t3), X(m-1, n-1, t2), X(m+1, n-1, t2), X(m-1, n+1, t2), X(m+1, n+1, t2))$$

wherein, $\alpha'$ represents a weight for an average of the vertical component when a motion is present, $\beta$ represents a weight for an average of the time axis component when a motion is not present, $\gamma$ represents a weight for an average of the vertical component, $\theta$ represents a weight for an average of the time axis component.

5. Scan converting method for a television receiver as defined in claim 2, wherein said weight for the vertical component and the weight for the time axis component are at least more than one.

6. Scan converting method of television receiver as defined in claim 3, wherein said weight for an average of the vertical component when the motion is present and said weight for the time axis component when the motion is not present, of which sum has a value of an odd number.

7. Scan converting method for a television receiver as defined in claim 4, wherein said weight for an average of the vertical component when said motion is present and said weight for the time axis component when the motion is not present, of which sum has a value of an odd number.

8. Scan converting method for a television receiver as defined in claim 5, wherein said weight for the vertical component and said weight for the time axis component are at least more than one.

9. Scan converting method for a television receiver as defined in claim 5, wherein said weight for an average of the vertical component when the motion is present and said weight for the time axis component when the motion is not present, of which sum has a value of an odd number.

10. Scan converter for a television receiver comprising:

a means for determining horizontal, vertical and time axis detail degrees from a composite video signal;

a means for separating a luminance signal and a chrominance signal from the composite video signal in accordance with each said detail signal;

a means for detecting a first field to be interpolated, a second field which is a previous field of said first field and a third field which is a later field of said first field, from said separated luminance signal;

a means for generating control signals by logically operating on said each detail signal;

a means for executing a median operation by putting weights to substantial pixel samples existing in said first, second and third fields in accordance with said control signal;

a means for ⅔ time compressing said median operated signal and a presently applied field; and a means for increasing the scanning lines in double by selectively switching said ⅔ time compressed signals.

11. Scan converter for a television receiver as defined in claim 10, wherein said detecting means has at least two memories for delaying the fields.

12. Scan converter for a television receiver as defined in claim 11, wherein said components includes a diagonal component, vertical component, horizontal component, time axis component, an average of the vertical component, and an average of the time axis component.

13. Scan converter for a television receiver as defined in claim 12, wherein said control signal generating means comprises:

a first gate which inputs a horizontal detail signal and a vertical detail signal outputted as a control signal for putting a weight to said vertical component and thereby outputs a control signal for putting a weight to said diagonal component; a second gate which inputs the horizontal detail signal and a time axis detail signal outputted as a control signal for putting a weight to said time axis component and an average of said time axis component and thereby outputs a control signal for putting a weight to said horizontal component; and a third gate which inputs said time axis detail signal and thereby outputs a control signal for putting a weight to an average of said horizontal component.

14. Scan converter for a television receiver as defined in claim 13, wherein said median operating means includes a terminal which is made to put at least more than one weight to said horizontal component and said time axis component.

15. Scan converter for a television receiver as defined in claim 13, wherein said median operating means includes a terminal which is so made that sum of an average of said vertical component and an average of said time axis component becomes an odd number.

16. Scan converter for a television receiver as defined in claim 11, wherein said control signal generating means uses only a time axis detail signal as a control signal, and puts a weight only to an average of said vertical component and an average of said time axis component in accordance with said control signal whereby makes the sum of the weights to become an odd number, and said diagonal component, said vertical component and said time axis component put the weights by one irrespective of the control signal.

17. Scan converter for a television receiver as defined in claim 11, wherein said control signal generating means uses only a time axis detail signal as a control signal, and puts a weight to an average of said vertical component and an average of said time axis component in accordance with said control signal whereby makes the sum of said weights to become an odd number, and puts the weights by one only to one component among said vertical component and the time axis component in accordance with said control signal, and said diagonal component, said vertical component and said time axis component put the weights by one irrespective of the control signal.

18. Scan converting method for a television receiver comprising steps for:

judging a horizontal, vertical, and time axis detail degrees from a composite video signal;

separating a luminance signal and chrominance signal from composite video signal in accordance with each said judged detail degree;

detecting a first field to be interpolated, a second field which is a previous field of said first field and a third field which is a later field of said first field, from said chrominance signal;

logically combining each said judged detail degree so as to generate control signals;

executing median operation by putting weights to substantial pixel samples existing in said first, second, and third fields in accordance with said control signals;

⅔ time compressing said median operated signal and a presently applied field; and increasing the scanning lines in double by selectively switching said ⅔ time compressed signals.

19. Scan converter for a television receiver comprising:

a means for determining horizontal, vertical and time axis detail degrees from a composite video signal;

a means for separating a luminance signal and a chrominance signal from the composite video signal in accordance with each said detail signal;

a means for detecting a first field to be interpolated, a second field which is a previous field of said first field and a third field which is a later field of said first field, from said separated chrominance signal;

a means for generating control signals by logically operating on said each detail signal;

a means for executing a median operation by putting weights to substantial pixel samples existing in said first, second and third fields in accordance with said control signal;

a means for ⅔ time compressing said median operated signal and a presently applied field; and a means for increasing the scanning lines in double by selectively switching said ⅔ time compressed signals.

* * * * *